United States Patent
Goh et al.

(10) Patent No.: US 12,321,530 B2
(45) Date of Patent: Jun. 3, 2025

(54) SYSTEM AND METHOD FOR A POWER SUSTAINABILITY KEYBOARD WITH SOLENOIDAL ENERGY HARVESTER DEVICE

(71) Applicant: Dell Products, LP, Round Rock, TX (US)

(72) Inventors: Peng Lip Goh, Singapore (SG); Deeder M. Aurongzeb, Austin, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 79 days.

(21) Appl. No.: 18/376,730

(22) Filed: Oct. 4, 2023

(65) Prior Publication Data

US 2025/0117094 A1    Apr. 10, 2025

(51) Int. Cl.
G06F 3/02 (2006.01)

(52) U.S. Cl.
CPC .................... *G06F 3/021* (2013.01)

(58) Field of Classification Search
CPC .......... G06F 1/263; G06F 1/30; G06F 1/3212; G06F 1/3287; G06F 1/3296; H01H 2239/076
See application file for complete search history.

(56) References Cited

U.S. PATENT DOCUMENTS

| | | | |
|---|---|---|---|
| 4,099,437 A | 7/1978 | Stavrou | |
| 5,911,529 A * | 6/1999 | Crisan | H03K 17/972 400/474 |
| 6,411,280 B1 | 6/2002 | Aarts | |
| 11,079,816 B1 | 8/2021 | North | |
| 2003/0047435 A1 | 3/2003 | Lee | |
| 2005/0168108 A1 | 8/2005 | Face | |
| 2009/0267892 A1 | 10/2009 | Faubert | |
| 2014/0091857 A1 | 4/2014 | Bernstein | |
| 2014/0217853 A1 | 8/2014 | Mankowski | |
| 2016/0049265 A1 | 2/2016 | Bernstein | |
| 2016/0196935 A1 | 7/2016 | Bernstein | |
| 2019/0087771 A1 * | 3/2019 | Westphal | G06Q 10/08 |
| 2022/0115906 A1 * | 4/2022 | Deng | H01H 13/70 |
| 2022/0176241 A1 | 6/2022 | Goh | |
| 2024/0192760 A1 * | 6/2024 | Yi | G06F 1/3287 |

FOREIGN PATENT DOCUMENTS

EP    2112575 A1    10/2009

* cited by examiner

*Primary Examiner* — Robin J Mishler
(74) *Attorney, Agent, or Firm* — Prol Intellectual Property Law, PLLC; H. Kenneth Prol

(57) ABSTRACT

A wireless keyboard operatively coupled to an information handling system includes a wireless keyboard microcontroller and a wireless keyboard power management unit (PMU) to provide power to the wireless keyboard microcontroller and the wireless keyboard PMU operatively coupled to a battery and an ultracapacitor. The wireless keyboard further including a solenoidal energy harvester device operatively coupled to the wireless keyboard PMU and placed under a first key formed on the wireless keyboard to charge the ultracapacitor when the first key is actuated and the wireless keyboard microcontroller to determine between a wake or standby state from determining when an actuation/engagement sensor has been triggered or not to have the wireless keyboard PMU switch a power source to the ultracapacitor when in standby mode or a battery in a wake mode.

20 Claims, 6 Drawing Sheets

SYSTEM AND METHOD FOR A POWER SUSTAINABILITY KEYBOARD WITH SOLENOIDAL ENERGY HARVESTER DEVICE

FIELD OF THE DISCLOSURE

The present disclosure generally relates to a wireless keyboard. The present disclosure more specifically relates to a wireless keyboard that includes an ultracapacitor that is charged, while the wireless keyboard is not in a standby mode, via a solenoidal energy harvester device.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more gaming applications. Further, the information handling system may include any number of wireless peripheral devices including a wireless keyboard used to provide input to and receive output from the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
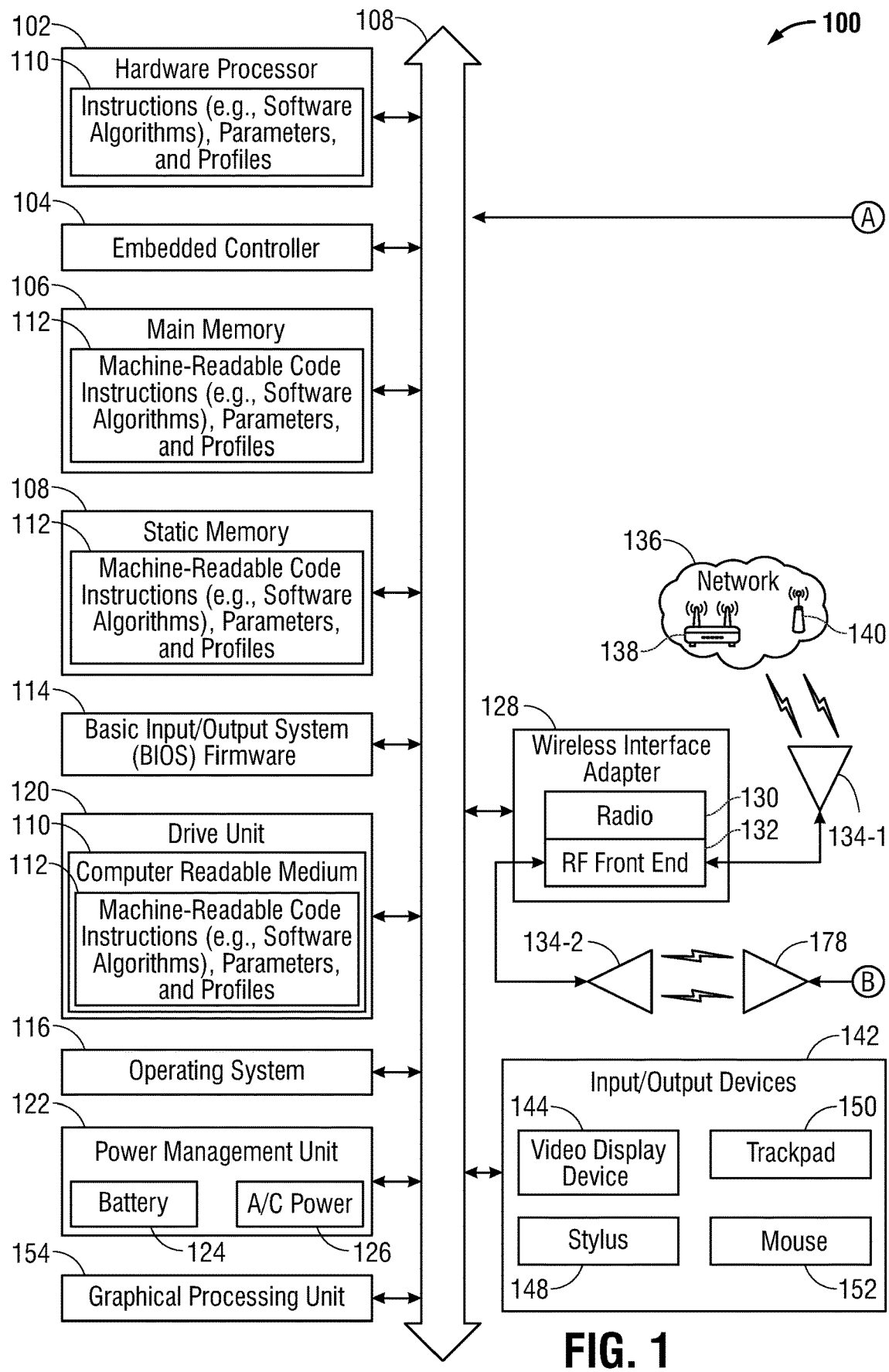
FIG. 1 is a block diagram illustrating an information handling system with a wireless keyboard according to an embodiment of the present disclosure.
Figure 1:
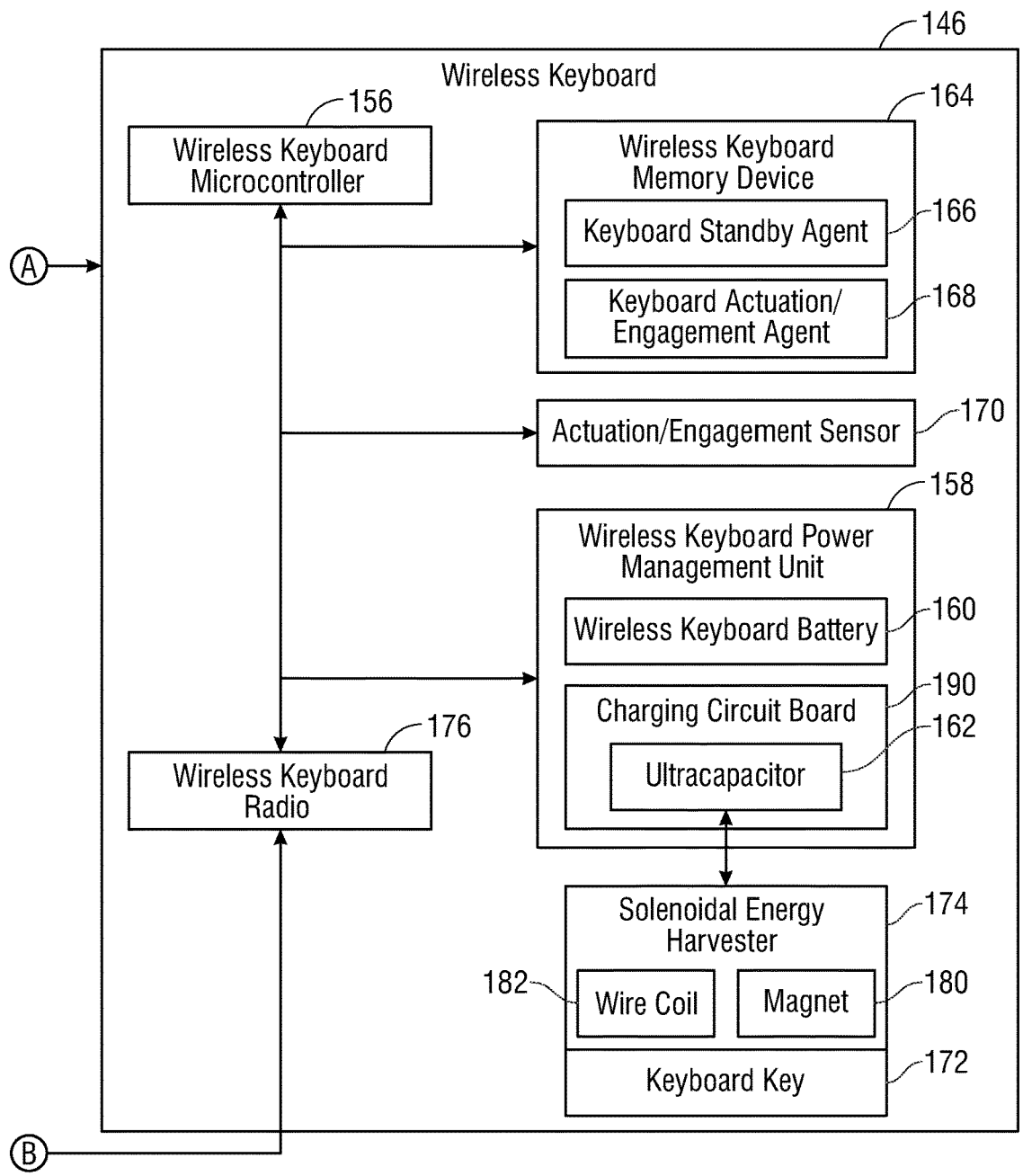

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Information handling systems include input/output I/O devices that allow a user to interface with the information handling system. Some of these I/O devices may be wireless I/O devices that transceive data to and from the wireless I/O device. Specifically, a wireless keyboard may communicate alphanumeric data to the information handling system as the user actuates one or more keys of the wireless keyboard. However, because the wireless keyboard is continuously communicating with the information handling system regardless of whether input at the wireless keyboard is received from a user, the wireless keyboard will consume power even where a standby mode is activated. The power source is often a battery. However, with the wireless keyboard constantly being powered on, even in a standby mode, the battery is still drained of power. This causes the user to have to constantly replace the battery or recharge the same. This may lead to significant costs associated with battery replacement. Additionally, because any dry cell batteries have to be replaced, the disposal of the batteries may increase damage to the environment even if they are disposed of properly by the user.

The present specification describes a wireless keyboard operatively coupled to an information handling system that includes a wireless keyboard microcontroller and a wireless keyboard power management unit (PMU) to provide power to the wireless keyboard microcontroller. In an embodiment, the wireless keyboard PMU is operatively coupled to a battery and an ultracapacitor. The wireless keyboard also includes a solenoidal energy harvester device operatively coupled to the wireless keyboard PMU and placed under a first key formed on the wireless keyboard to charge the ultracapacitor when the first key is actuated. The actuation of the key on the keyboard where the solenoidal energy harvester is located charges the ultracapacitor. In an embodiment, the wireless keyboard further includes a keyboard actuation/engagement agent to, when executed by the wireless keyboard microcontroller, determine when a key on the wireless keyboard is actuated based on input from an actuation/engagement sensor. The keyboard actuation/engagement agent may operate with a keyboard standby agent to control when the wireless keyboard enters or exits a standby mode and with the wireless keyboard PMU switch a power source to the ultracapacitor when in standby mode or to battery mode in either circumstance.

In an embodiment, the wireless keyboard includes the keyboard actuation/engagement agent to, when executed by the wireless keyboard microcontroller, detect when a key on the wireless keyboard is actuated based on input from an actuation/engagement sensor and provide keyboard engagement data to the wireless keyboard microcontroller to switch a power source from the ultracapacitor to the battery. The execution of code instructions for the keyboard actuation/ engagement agent and the keyboard standby agent by a wireless keyboard microcontroller allows the wireless keyboard microcontroller to, with the wireless keyboard PMU, dynamically control whether power is provided to the wireless keyboard via a battery or the ultracapacitor.

In an embodiment, the wireless keyboard includes the keyboard standby agent to, when executed by the wireless keyboard microcontroller, determine when a threshold time period has expired since a user has last actuated any key on the keyboard based on the keyboard engagement data received by the keyboard actuation/engagement agent from the wireless keyboard microcontroller to place the wireless keyboard in a standby mode. The execution of code instructions of the keyboard standby agent allows the wireless keyboard microcontroller to dynamically, with the wireless keyboard PMU, change from the wireless keyboard being powered by the battery to being powered by the ultracapacitor thereby reducing the power consumption at the battery. This reduces the number of batteries being used to power the wireless keyboard including frequency of need to recharge rechargeable batteries. As a consequence, this reduces the number of dry cell batteries or rechargeable batteries that are thrown away and causing environmental issues associated with that disposal. Still further, this reduces the cost of operating the wireless keyboard by the user as well as requiring fewer batteries over the lifetime of the wireless keyboard.

Turning now to the figures, FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 138, a base station transceiver 140, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system 100 may include main memory 106, (volatile (e.g., random-access memory, etc.), or static memory 108, nonvolatile (read-only memory, flash memory etc.) or any combination thereof), one or more hardware processing resources, such as a hardware processor 102 that may be a central processing unit (CPU), a graphics processing unit (GPU) 154, hardware processor 102, embedded controller (EC) 104, or any combination thereof. Additional components of the information handling system 100 may include one or more storage devices such as static memory 108 or drive unit 120. The information handling system 100 may include or interface with one or more communications ports for communicating with external devices, as well as various input and output (I/O) devices 142, such as the wireless keyboard 146 described herein, a touchpad 150, a mouse 152, a stylus 148, a video/graphics display device 144, or any combination thereof. Portions of an information handling system 100 may themselves be considered information handling systems 100.

Information handling system 100 may include devices or modules that embody one or more of the devices or execute instructions for one or more systems and modules. The information handling system 100 may execute instructions (e.g., software algorithms) with one or more hardware processing resources, parameters, and profiles 112 that may operate on servers or systems, remote data centers, or on-box in individual client information handling systems according to various embodiments herein. In some embodiments, it is understood any or all portions of instructions (e.g., software algorithms), parameters, and profiles 112 may operate on a plurality of information handling systems 100.

The information handling system 100 may include the hardware processor 102 such as a central processing unit (CPU). Any of the processing resources may operate to execute code that is either firmware or software code. Moreover, the information handling system 100 may include memory such as main memory 106, static memory 108, and disk drive unit 120 (volatile (e.g., random-access memory, etc.), nonvolatile memory (read-only memory, flash memory etc.) or any combination thereof or other memory with computer readable medium 110 storing instructions (e.g., software algorithms), parameters, and profiles 112 executable by the EC 104, hardware processor 102, GPU 154, or any other processing device. The information handling system 100 may also include one or more buses 118 operable to transmit communications between the various hardware components such as any combination of various I/O devices 142 as well as between hardware processors 102, an EC 104, the operating system (OS) 116, the basic input/output system (BIOS) 114, the wireless interface adapter 128, or a radio module, among other components described herein. In an embodiment, the information handling system 100 may be in wired or wireless communication with the I/O devices 142 such as the wireless keyboard 146 described herein, a mouse 152, video display device 144, stylus 148, or touchpad 150 among other peripheral devices.

The information handling system 100 further includes a video/graphics display device 144. The video/graphics display device 144 in an embodiment may function as a liquid crystal display (LCD), an organic light emitting diode (OLED), a flat panel display, or a solid-state display. Additionally, as described herein, the information handling system 100 may include one or more other I/O devices 142 including the wireless keyboard 146 described herein that allow the user to interface with the information handling system 100 via the video/graphics display device 144, such as a cursor control device (e.g., a mouse 152, touchpad 150, or gesture or touch screen input), and/or a stylus 148, among others. Various drivers and control electronics may be operatively coupled to operate the I/O devices 142 according to the embodiments described herein. The present specification contemplates that the I/O devices 142 may be wired or wireless. In the context of the wireless keyboard 146 described in embodiments of the present disclosure herein, the wireless keyboard 146 is operatively coupled to the information handling system 100 via a wireless connection via a wireless keyboard radio 176 and wireless keyboard antenna 178.

A network interface device of the information handling system 100 shown as wireless interface adapter 128 can provide connectivity among devices such as with Bluetooth® (e.g., 2.4 GHz) or to a network 136, e.g., a wide area network (WAN), a local area network (LAN), wireless local area network (WLAN), a wireless personal area network (WPAN), a wireless wide area network (WWAN), or other network. The wireless keyboard 146 may be wirelessly coupled to the information handling system 100 via a Bluetooth®, Bluetooth Low Energy (BLE), WPAN, WiFi or other suitable wireless protocol. In an embodiment, the WAN, WWAN, LAN, and WLAN may each include an AP 138 or base station 140 used to operatively couple the information handling system 100 to a network 136. In a specific embodiment, the network 136 may include macro-cellular connections via one or more base stations 140 or a wireless AP 138 (e.g., Wi-Fi), or such as through licensed or unlicensed WWAN small cell base stations 140. Connectivity may be via wired or wireless connection. For example, wireless network wireless APs 138 or base stations 140 may be operatively connected to the information handling system 100. Wireless interface adapter 128 may include one or more radio frequency (RF) subsystems (e.g., radio 130) with transmitter/receiver circuitry, modem circuitry, one or more antenna radio frequency (RF) front end circuits 132, one or more wireless controller circuits, amplifiers, antennas 134-1, 134-2 and other circuitry of the radio 130 such as one or more antenna ports used for wireless communications via multiple radio access technologies (RATs). The radio 130 may communicate with one or more wireless technology protocols. In embodiments described herein, the wireless interface device 128 with its radio 130, RF front end 132 and antenna 134-2 is used to communicate with the wireless keyboard 146 via, for example, a Bluetooth® or BLE (e.g., 2.4 GHZ) frequency band or Bluetooth 6 (6 GHZ) frequency band.

In an embodiment, the wireless interface adapter 128 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, or similar wireless standards may be used. Wireless interface adapter 128 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums. The wireless interface adapter 128 can represent an add-in card, wireless network interface module that is integrated with a main board of the information handling system 100 or integrated with another wireless network interface capability, or any combination thereof.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 112 or receives and executes instructions, parameters, and profiles 112 responsive to a propagated signal, so that a device connected to a network 136 may communicate voice, video, or data over the network 136. Further, the instructions 112 may be transmitted or received over the network 136 via the network interface device or wireless interface adapter 128.

The information handling system 100 may include a set of instructions 112 that may be executed to cause the computer system to perform any one or more of the methods or computer-based functions disclosed herein. For example, instructions 112 may be executed by a hardware processor 102, GPU 154, EC 104 or any other hardware processing resource and may include software agents, or other aspects or components used to execute portions of the methods and systems described herein. Various software modules comprising application instructions 112 may be coordinated by an OS 116, and/or via an application programming interface (API). An example OS 116 may include Windows®, Android®, and other OS types. Example APIs may include Win 32, Core Java API, or Android APIs.

In an embodiment, the information handling system 100 may include a disk drive unit 120. The disk drive unit 120 and may include machine-readable code instructions, parameters, and profiles 112 in which one or more sets of machine-readable code instructions, parameters, and profiles 112 such as firmware or software can be embedded to be executed by the hardware processor 102 or other hardware processing devices such as a GPU 154 or EC 104, or other microcontroller unit to perform the processes described herein. Similarly, main memory 106 and static memory 108 may also contain a computer-readable medium for storage of one or more sets of machine-readable code instructions, parameters, or profiles 112 described herein. The disk drive unit 120 or static memory 108 also contain space for data storage. Further, the machine-readable code instructions, parameters, and profiles 112 may embody one or more of the methods as described herein. In a particular embodiment, the machine-readable code instructions, parameters, and profiles 112 may reside completely, or at least partially, within the main memory 106, the static memory 108, and/or within the disk drive 120 during execution by the hardware processor 102, EC 104, or GPU 154 of information handling system 100.

Main memory 106 or other memory of the embodiments described herein may contain computer-readable medium (not shown), such as RAM in an example embodiment. An example of main memory 106 includes random access memory (RAM) such as static RAM (SRAM), dynamic RAM (DRAM), non-volatile RAM (NV-RAM), or the like, read only memory (ROM), another type of memory, or a combination thereof. Static memory 108 may contain computer-readable medium (not shown), such as NOR or NAND flash memory in some example embodiments. The applications and associated APIs, for example, may be stored in static memory 108 or on the disk drive unit 120 that may include access to a machine-readable code instructions, parameters, and profiles 112 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 122 (a.k.a. a power supply unit (PSU)). The PMU 122 may include a hardware controller and executable machine-readable code instructions to manage the power provided to the components of the information handling system 100 such as the hardware processor 102 and other hardware components described herein. The PMU 122 may control power to one or more components including the one or more drive units 120, the hardware processor 102 (e.g., CPU), the EC 104, the GPU 154, a video/graphic display device 144, or other wired I/O devices 142 such as the stylus 148, a mouse 152, a wired keyboard apart from the wireless keyboard 146, and a touchpad 150 and other components that may require power when a power button has been actuated by a user. In an embodiment, the PMU 122 may monitor power levels and be electrically coupled to the information handling system 100 to provide this power. The PMU 122 may be coupled to the bus 118 to provide or receive data or machine-readable code instructions. The PMU 122 may regulate power from a power source such as the battery 124 or AC power adapter 126. In an embodiment, the battery 124 may be charged via the AC power adapter 126 and provide power to the components of the information handling system 100, via wired connections as applicable, or when AC power from the AC power adapter 126 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 110 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described herein, the information handling system is operatively coupled to a wireless keyboard 146. The wireless keyboard 146 may be used by a user to provide input to the information handling system 100 in the form or alpha-numeric input for example. As described herein, the wireless keyboard 146 includes a wireless keyboard radio 176 and wireless keyboard antenna 178 that is used to communicate with the information handling system 100 that, in embodiments herein, executes a wireless keyboard driver that allows the communication between the information handling system 100 and the wireless keyboard 146.

The wireless keyboard 146 further includes a wireless keyboard microcontroller 156. The wireless keyboard microcontroller 156 may be any type of processing device that is capable of executing the machine-readable code instructions (e.g., software algorithms), parameters, and profiles such as the keyboard standby agent 166 and keyboard actuation/engagement agent 168 described herein. The wireless keyboard microcontroller 156 may also receive input from, for example, an actuation/engagement sensor 170 used to determine whether a keystroke or the keyboard key 172 or any keystroke has been actuated for any wireless keyboard keys as well as whether a power supply should be switched from a ultracapacitor 162 to wireless keyboard battery 160. The wireless keyboard microcontroller 156 may also determine, when no keys have been actuated or other engagement detected for a period, whether power should be switched from a wireless keyboard battery 160 to the ultracapacitor 162. The actuation/engagement sensor 170 may be any one or more of an array of key switches for the wireless keyboard 146 in some embodiments.

The wireless keyboard 146 further includes a wireless keyboard memory device 164. The wireless keyboard memory device 164 may be used to store computer readable code of the keyboard standby agent 166 and/or keyboard actuation/engagement agent 168 as well as any data used by the wireless keyboard microcontroller 156 to execute the systems and methods described herein.

The wireless keyboard 146 also includes a wireless keyboard PMU 158. The wireless keyboard PMU 158 may include a hardware controller and executable machine-readable code instructions to manage the power provided to the components of the wireless keyboard 146 such as the wireless keyboard microcontroller 156, the actuation/engagement sensor(s) 170, the wireless keyboard memory device 164, and other hardware components described herein. In an embodiment, the wireless keyboard PMU 158 may monitor power levels and be electrically coupled to the wireless keyboard 146 to provide this power. The wireless keyboard PMU 158 may be used, via operation of the wireless keyboard microcontroller 156, to dynamically regulate power from power sources within the wireless keyboard 146 such as the wireless keyboard battery 160 and the ultracapacitor 162 described herein.

The wireless keyboard 146 further includes a solenoidal energy harvester device 174 operatively coupled to the ultracapacitor 162 such that actuation of the solenoidal energy harvester device 174 creates an electrical charge used to charge the ultracapacitor 162 via a charging circuit. The wireless keyboard microcontroller 156 and wireless keyboard PMU 158 may coordinate the charging of the ultracapacitor 162 with the solenoidal energy harvester device 174 as described herein when the user is engaging with the wireless keyboard 146. In an embodiment, the wireless keyboard microcontroller 156 may execute the keyboard standby agent 166 to determine, with the actuation/engagement sensor 170, when a user's presence in front of or user interacts with the wireless keyboard 146 or has not interacted or is not present in front of the wireless keyboard 146. This allows the wireless keyboard microcontroller 156 to determine whether the wireless keyboard 146 is to be placed in a standby mode when no user presence is detected or when no actuation of a keyboard key 172 by the user is detected after a period of time. When placed in a standby mode, the wireless keyboard 146 may be powered by the ultracapacitor 162 instead of the wireless keyboard battery 160 thereby conserving the power within the wireless keyboard battery 160 during non-use of the wireless keyboard 146.

In an embodiment, the actuation/engagement sensor 170 may be any sensor that detects the user's presence in front of the wireless keyboard 146 or detect the user interacting with the wireless keyboard 146. By way of example, the actuation/engagement sensor 170 may be a key switch or other triggering device that detects a user actuating any key or a specific key on the wireless keyboard 146 in an embodiment. For example, the actuation/engagement sensor 170 may include a key on a QWERTY-type alphanumeric keyboard of the wireless keyboard 146 that, when providing input to the wireless keyboard microcontroller 156, indicates that the keyboard key 172 has been pressed or actuated by a user. In an embodiment, the actuation/engagement sensor 170 may be a sensor that detects a user's interaction with the housing of the wireless keyboard 146 such as a motion detector or capacitive detector that detects motion near the wireless keyboard 146. In an embodiment, the actuation/engagement sensor 170 may be a proximity sensor that emits an electromagnetic, infrared, or visible light field or beam to detect changed in the field of the beam or field or a return signal bouncing off of an object such as the user.

When the actuation/engagement sensor 170 is triggered, data indicating as such is transmitted to the wireless keyboard microcontroller 156. With this data the wireless keyboard microcontroller 156 may cause the wireless keyboard 146 to exit the standby mode. As a result of exiting the standby mode, the wireless keyboard microcontroller 156, with the wireless keyboard PMU 158, may cause the wireless keyboard 146 to be powered using the wireless keyboard battery 160 instead of the ultracapacitor 162. As described herein, this prevents the wireless keyboard 146 from being powered constantly by a wireless keyboard battery 160 during standby mode unless the ultracapacitor 162 drains, thereby reducing the need to replace the wireless keyboard battery 160. Additionally, while the wireless keyboard 146 is not in standby mode, the ultracapacitor 162 is being charged by actuation of the keyboard key 172 under which a solenoidal energy harvester device 174 has been placed.

In an embodiment, the solenoidal energy harvester device 174 may include a solenoid device that converts movement of a magnet 180 (e.g., permanent magnet) through a wire coil 182 into an electrical charge having a current and voltage. In an embodiment, the magnet 180 and wire coil 182 of the solenoidal energy harvester device 174 is placed on and under any keyboard key 172 on the wireless keyboard 146. In an embodiment, the magnet 180 may be operatively coupled to the underside of the keyboard key 172 with the wire coil 182 operatively coupled to the chassis of the wireless keyboard 146 such that when the user actuates or presses down on the keyboard key 172, the magnet 180 passes into the center of the wire coil 182. This creates an electrical charge at the wire coil 182 which, in an embodiment, is conducted to a charging circuit board 190 associated with the wireless keyboard PMU 158 and the ultracapacitor 162 to charge the ultracapacitor 162 during use of the wireless keyboard 146. In an alternative embodiment, the wire coil 182 may be operatively coupled to the underside of the keyboard key 172 with the magnet 180 operatively coupled to the chassis of the wireless keyboard 146. In this embodiment, the when the user actuates or presses down on the keyboard key 172, the center of the wire coil 182 coupled to the underside of the keyboard key 172 surrounds the magnet 180. This creates an electrical charge at the wire coil 182 which, in an embodiment, is conducted to a charging circuit board 190 associated with the wireless keyboard PMU 158 and the ultracapacitor 162 to charge the ultracapacitor 162 during use of the wireless keyboard 146. It is appreciated that any charging circuitry and wiring may be used to electrically couple the wire coil 182 to the charging circuit board 190 and ultracapacitor 162 so that electrical current and voltage may be passed to the ultracapacitor 162 to charge the ultracapacitor 162 as described herein.

During use, as the user presses down on the keyboard key 172, the magnet 180 (or inductive coil 182) operatively coupled to the underside of the keyboard key 172 is forced downward. This causes the magnet 180 to pass within the center of the wire coil 182 creating an electrical charge. In order to increase the speed at which the ultracapacitor 162 is charged, one or more solenoidal energy harvester devices 174 may be placed under one or more keyboard keys 172 on the wireless keyboard 146 that are actuated most often during common use of the wireless keyboard 146. In one example embodiment, those most actuated keyboard keys 172 may include a spacebar that is actuated by a user to separate words being typed or other uses, such as in gaming. Additionally, in an embodiment, because of the development of predictive text being used with word processing software applications, a "tab" key may also be a candidate keyboard key 172 for the solenoidal energy harvester device 174 to be placed under due to the fact that this key may be used as a signal to accept the predicted text presented to the user during execution of the word processing software application for example. It is appreciated that any number of keyboard keys 172 formed on the wireless keyboard 146 may include a solenoidal energy harvester device 174 used to charge the ultracapacitor 162 while the wireless keyboard 146 is not in a standby mode as described herein.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
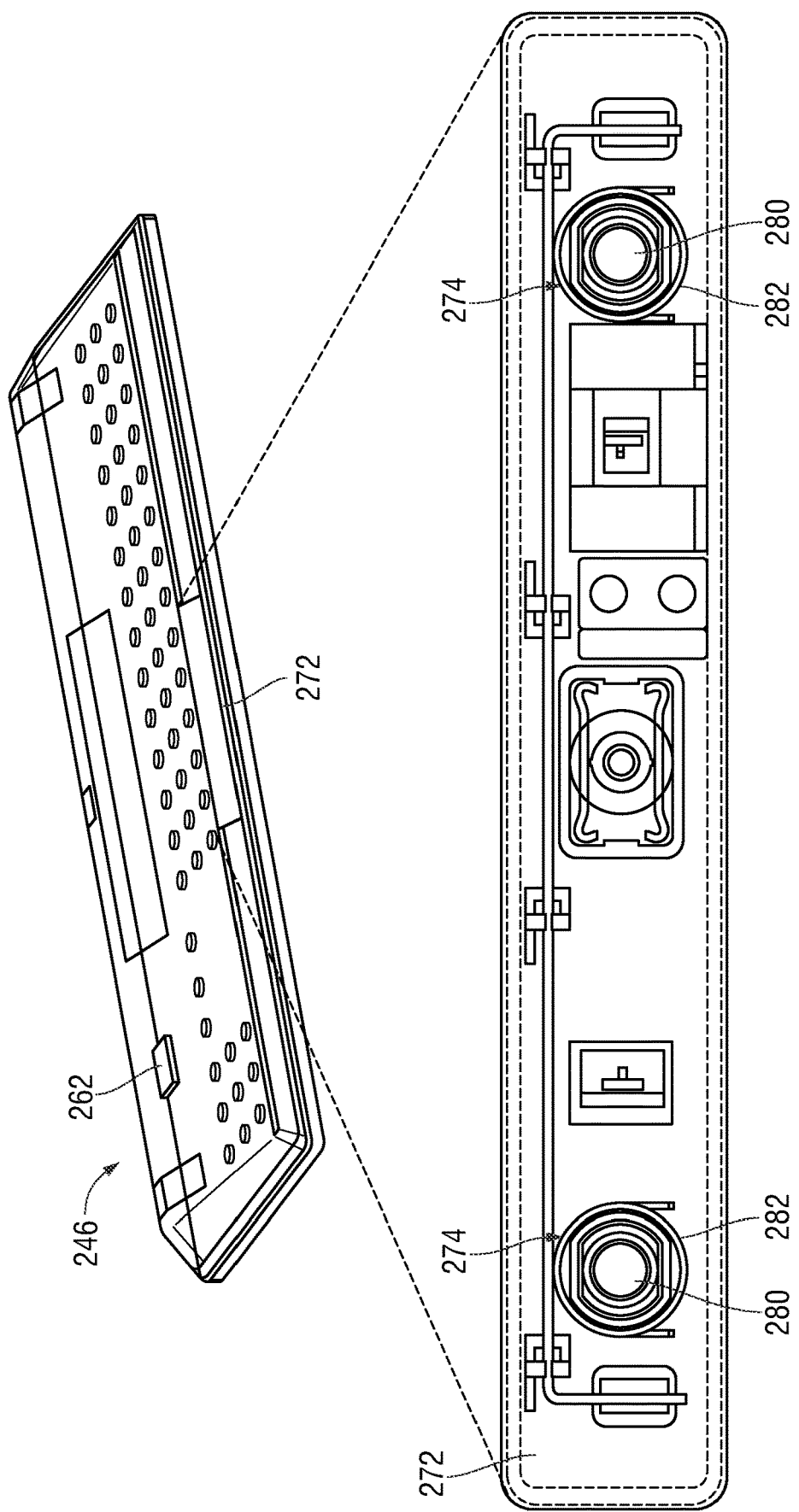
FIG. 2 is a perspective view of a wireless keyboard having an ultracapacitor with an expanded view of a keyboard key with a solenoidal energy harvester device formed into the wireless keyboard according to an embodiment of the present disclosure.

FIG. 2 is a perspective view of a wireless keyboard 246 having an ultracapacitor 262 with an expanded view of a keyboard key 272 with a solenoidal energy harvester device 274 formed into the wireless keyboard 246 according to an embodiment of the present disclosure. As described herein, the wireless keyboard 246 includes a number of keyboard keys 272, including the spacebar that is highlighted in FIG. 2, used by a user to provide input to the information handling system (e.g., 100, FIG. 1). Among these keyboard keys 272 is the space bar used by a user to provide a space between words in a sentence, for example. Because of the relative frequency of a user actuation this space bar, one or more solenoidal energy harvester devices 274 described herein may be placed under this particular keyboard key 272 in order to charge the ultracapacitor 262 as described herein.

During operation of the wireless keyboard 246, the user may initialize the wireless keyboard 246 by, for example, actuating a power switch. This causes the wireless keyboard microcontroller to be activated and begin the execute computer readable program code of the keyboard standby agent and keyboard actuation/engagement agent as described herein. For example, the keyboard actuation/engagement agent may be executed to determine if a user has actuated a keyboard key 272 on the wireless keyboard 246 or is otherwise engaging with the wireless keyboard 246. For example, the keyboard actuation/engagement agent may determine whether any keyboard key 272 has been actuated on the wireless keyboard 246 within a period of time regardless of whether a solenoidal energy harvester device 274 has been placed under that particular keyboard key 272. Where a keyboard key 272 has been actuated within a threshold period of time, the keyboard actuation/engagement agent may indicate that by providing input data to the wireless keyboard microcontroller and, where necessary, restart a counter that is used to determine whether the threshold period of time has been reached. Additionally, or alternatively, the keyboard actuation/engagement agent may be operatively coupled to an actuation/engagement sensor that detects the user's presence or movement of the wireless keyboard 246. Thus, in certain embodiments, the actuation/engagement sensor may be a motion sensor (e.g., IR sensor) or a motion sensor that detects this user interaction or engagement with the wireless keyboard 246. Again, when the keyboard actuation/engagement agent determines that, via the actuation/engagement sensor, the user is engaging with the wireless keyboard 246, this engagement data is sent to the wireless keyboard microcontroller that, where necessary, restarts the counter that is used to determine whether the threshold period of time has been reached.

In those instances where the threshold period of time has been determined to have been reached by the wireless keyboard microcontroller, the wireless keyboard microcontroller may execute code instructions of a keyboard standby agent that places the wireless keyboard 246 in a standby mode. This standby mode may be any type of sleep mode that is a lower power mode for the wireless keyboard 246. The standby mode saves a significant amount of energy but still consumes energy, such as for the keyboard wireless radio to monitor wireless communications with an operatively coupled information handling system. In typical wireless keyboards 246 this still means that power from the wireless keyboard battery is still being drawn thereby, eventually, draining the wireless keyboard battery and requiring the user to replace the wireless keyboard battery more frequently. However, by execution of the keyboard standby agent by the wireless keyboard microcontroller, the wireless keyboard microcontroller may further coordinate with the wireless keyboard PMU to switch the power source from the wireless keyboard battery to the ultracapacitor 262 described herein. Because the ultracapacitor 262 had been charged via actuation of the keyboard key 272 by the user and movement of the magnet 180 through the center of the wire coil 182 of the solenoidal energy harvester device 274, the ultracapacitor 262 acts as a secondary power source to be used to power the wireless keyboard 246 during the lower power consuming state of the standby mode.

In an embodiment, the magnet 280 may be operatively coupled to the underside of the keyboard key 272 with the wire coil 282 operatively coupled to the chassis of the wireless keyboard 246 such that when the user actuates or presses down on the keyboard key 272, the magnet 280 passes into the center of the wire coil 282. This creates an electrical charge at the wire coil 182 which, in an embodiment, is conducted to a charging circuit board (not shown) associated with the wireless keyboard PMU (not shown) and the ultracapacitor 262 to charge the ultracapacitor 262 during use of the wireless keyboard 246. In an alternative embodiment, the wire coil 282 may be operatively coupled to the underside of the keyboard key 272 with the magnet 280 operatively coupled to the chassis of the wireless keyboard 246. In this embodiment, the when the user actuates or presses down on the keyboard key 272, the center of the wire coil 282 coupled to the underside of the keyboard key 272 surrounds the magnet 280. This creates an electrical charge at the wire coil 282 which, in an embodiment, is conducted to a charging circuit board associated with the wireless keyboard PMU and the ultracapacitor 262 to charge the ultracapacitor 262 during use of the wireless keyboard 246. It is appreciated that any circuitry and wiring may be used to electrically couple the wire coil 282 to the charging circuit board and ultracapacitor 262 so that electrical current and voltage may be passed to the ultracapacitor 262 to charge the ultracapacitor 262 as described herein.

Figure 3:
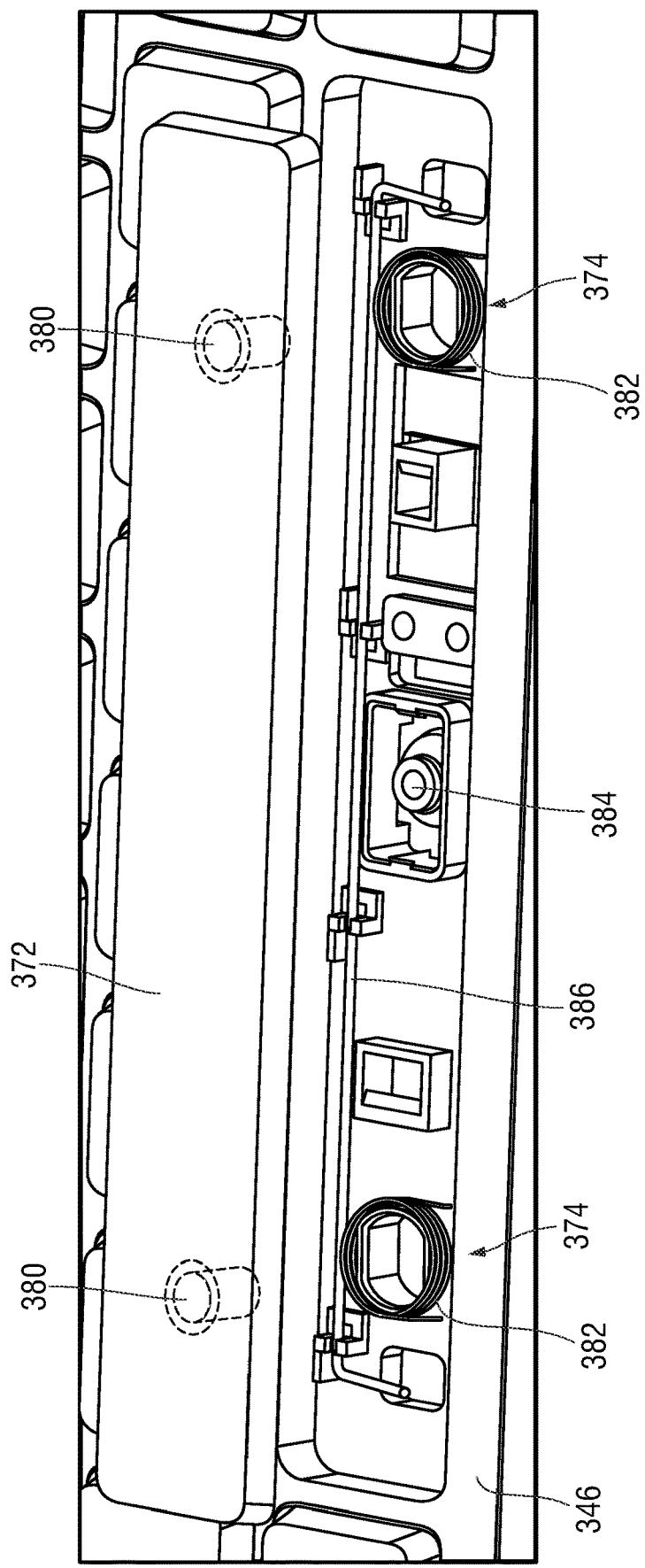
FIG. 3 is a perspective view of a keyboard key of a wireless keyboard with a solenoidal energy harvester formed thereunder according to an embodiment of the present disclosure.

FIG. 3 is a perspective view of a keyboard key 372 of a wireless keyboard 346 with a solenoidal energy harvester device 374 formed thereunder according to an embodiment of the present disclosure. As described herein, the keyboard key 372 may include a space bar formed on the wireless keyboard 346. However, the present specification contemplates that other keyboard keys 372 different or in addition to may be paired with a solenoidal energy harvester device 374 used to charge an ultracapacitor when the wireless keyboard 346 is not in a standby mode.

The keyboard key 372 with the magnet 380 coupled thereto in FIG. 3 has been removed away from the wire coil 382 of the solenoidal energy harvester device 374 to show a placement of the wire coil 382 in the solenoidal energy harvester device 374 relative to the keyboard key 372. As described herein, the magnet 380 has been coupled to the underside of the keyboard key 372 using, for example, a fastener or an adhesive. The wire coil 382 is similarly coupled to the chassis of the wireless keyboard 346 using any type of structure, fastener, or adhesive such that the wire coil 382 forms a channel in the center that allows the magnet 380 to be passed therethrough. A larger keyboard key 372, such as the space bar key, may have plural solenoidal energy harvester devices 374. As the keyboard key 372 is pressed downward (e.g., actuates the keyboard key 372), the magnet 380 is forced into this channel formed in the wire coil 382. This creates the electrical current and voltage at the solenoidal energy harvester device 374. This electrical current and voltage is passed through any number of wires to a charging circuit board (not shown) and ultracapacitor (not shown) formed with the housing of the wireless keyboard 346.

The keyboard key 372 also includes a key push bar 386. The key push bar 386 may be used balance actuation of a long keyboard key 372 and to uniformly push the keyboard key 372 back up after the user has actuated the keyboard key 372. The key push bar 386 is used in larger keys on the wireless keyboard such as space bar key as keyboard key 372 to stabilize the key 372 when pressed and return the keyboard key 372 to its unactuated position in a uniform manner. A spring may be operatively coupled to the key push bar 386 so that an upward force may be placed on the keyboard key 372 so that, once the force from the user is released, is returned upward. This also causes the keyboard key 372 to return to its unactuated position with the magnet 380 of the solenoidal energy harvester device 374 being pulled out from within the channel formed in the wire coil 382 which, in some embodiments, also creates a current and voltage. This allows the ultracapacitor to be charged when the keyboard key 372 is both pressed and released.

The keyboard key 372 further includes a rubber dome 384. The rubber dome 384 includes a contact pad material formed thereunder to contact with a contact pad. Therefore, as the rubber dome 384 is pressed down by the actuation of the keyboard key 372 by the user, this contact pad material (e.g., metal layer formed under the rubber dome 384) may contact a contact pad formed on a contact pad layer. This contact causes a signal to be sent to the wireless keyboard microcontroller indicative of the keyboard key 372 having been actuated. This causes this input to be sent to the information handling system via the wireless keyboard radio as described herein. As described herein, this input may also serve as part of an actuation/engagement sensor in some embodiments to indicate to the wireless keyboard microcontroller that the user has actuated a keyboard key causing the wireless keyboard microcontroller to execute the keyboard actuation/engagement agent and keyboard standby agent according to the principles described herein.

Figure 4A:
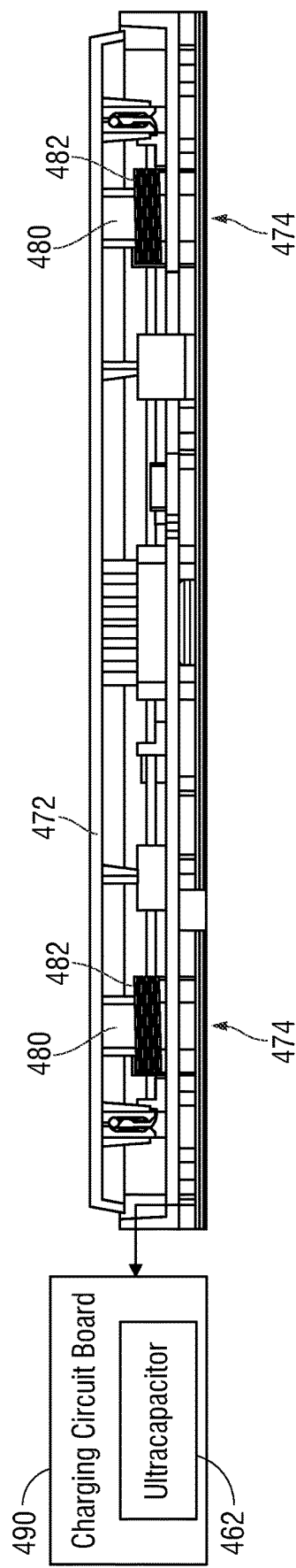
FIG. 4A is a side, cross-sectional cut-away view of a solenoidal energy harvester formed under a keyboard key in a wireless keyboard according to an embodiment of the present disclosure.
Figure 4B:
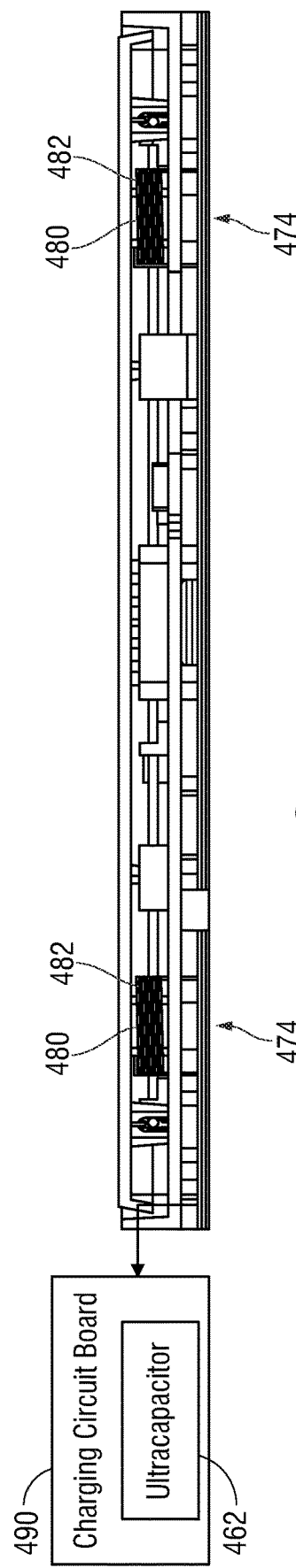
FIG. 4B is a side, cross-sectional cut-away view of a solenoidal energy harvester formed under a keyboard key in a wireless keyboard according to another embodiment of the present disclosure.

FIG. 4A is a side, cross-sectional view of solenoidal energy harvester device 474 formed under a keyboard key 472 in a wireless keyboard with the keyboard key 472 in an up position according to an embodiment of the present disclosure. FIG. 4B is also a side, cross-sectional view of a solenoidal energy harvester device 374 formed under a keyboard key 472 in a wireless keyboard with the keyboard key 472 in a down position according to another embodiment of the present disclosure. FIG. 4A shows the magnet 480 of the solenoidal energy harvester device 474 extending into but not moved into the channel formed in the wire coil 482 of the solenoidal energy harvester 474 while FIG. 4B shows the magnet 480 of the solenoidal energy harvester device 474 being moved into that channel. The spacebar keyboard key 472 shown in FIG. 4A and FIG. 4B shows an example embodiment with a keyboard key 472 having plural solenoidal energy harvesters 474.

This movement of the magnet 480 through the channel formed in the wire coil 482 creates an electrical charge at the wire coil 482 which, in an embodiment, is conducted to a charging circuit board 490 associated with the wireless keyboard PMU (not shown) and the ultracapacitor 462 to charge the ultracapacitor 462 during use of the wireless keyboard. In an alternative embodiment, the wire coil 482 may be operatively coupled to the underside of the keyboard key 472 with the magnet 480 operatively coupled to the chassis of the wireless keyboard 446. In this embodiment, the when the user actuates or presses down on the keyboard key 472, the center of the wire coil 482 coupled to the underside of the keyboard key 472 surrounds the magnet 480 which passes into and through the wire coil 482. This creates an electrical charge at the wire coil 482 which, in an embodiment, is conducted to a charging circuit board 490 associated with the wireless keyboard PMU and the ultracapacitor 462 to charge the ultracapacitor 462 during use of the wireless keyboard. It is appreciated that any circuitry and wiring may be used to electrically couple the wire coil 482 to the charging circuit board 490 and ultracapacitor 462 so that electrical current and voltage may be passed to the ultracapacitor 462 to charge the ultracapacitor 462 as described herein.

Figure 5:
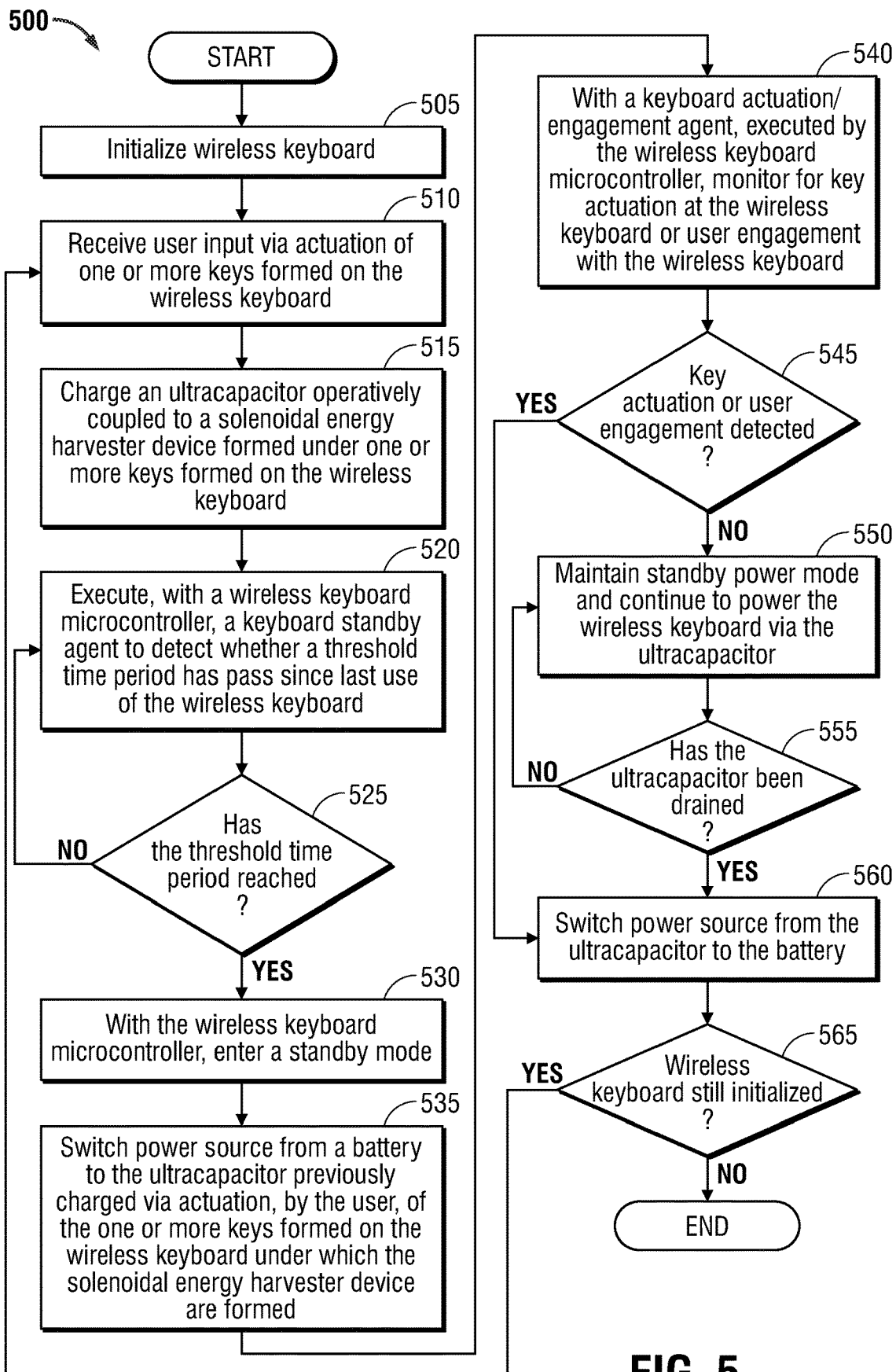
FIG. 5 is a flow diagram illustrating a method of operating a wireless keyboard with an energy harvester device operatively coupled to an information handling system according to an embodiment of the present disclosure.

FIG. 5 is a flow diagram illustrating a method 500 of operating a wireless keyboard operatively coupled to an information handling system according to an embodiment of the present disclosure. As described herein, the wireless keyboard includes at least one solenoidal energy harvester device formed under at least one keyboard key of the wireless keyboard. It is appreciated, therefore, that the ultracapacitor described herein may be charged by plural solenoidal energy harvester devices placed under one or plural keyboard keys.

The method 500 may include, at block 505, initializing the wireless keyboard. As described herein, the initialization of the wireless keyboard may include a user actuating a power button or switch to cause power to be provided to, at least, the wireless keyboard microcontroller.

At block 510, the method 500 further includes receiving user input at the wireless keyboard via actuation of one or more keys formed on the wireless keyboard. The wireless keyboard may be any type of keyboard including a QWERTY-type keyboard that allows a user to provide input to an information handling system. Because the wireless keyboard is wirelessly coupled to the information handling system, the wireless keyboard includes a wireless keyboard radio and wireless keyboard antenna to transceive this input data to the information handling system.

The method 500 includes, at block 515, charging the ultracapacitor operatively coupled to the solenoidal energy harvester device formed under one or more keys formed in the wireless keyboard. As described herein, the solenoidal energy harvester device includes a magnet operatively coupled to an underside of the keyboard key and a wire coil operatively coupled to a chassis of the wireless keyboard in an embodiment. In an alternative embodiment, the wire coil may be operatively coupled to the underside of the keyboard key with the magnet being operatively coupled to the chassis of the wireless keyboard. The wire coil may be operatively coupled to an ultracapacitor and charging circuit board of a wireless keyboard PMU. As the magnet passes through a channel formed in the wire coil, a current and voltage is generated. This current and voltage is used to charge the ultracapacitor housed within the housing of the wireless keyboard. It is appreciated that any circuitry may be used that facilitates the transmission and regulation of the current and voltage produced by the solenoidal energy harvester device to the ultracapacitor.

At block 520, the method 500 includes executing, with a wireless keyboard microcontroller, a keyboard standby agent to detect whether a threshold time period has passed since the wireless keyboard was last used and/or the user had been detected at the wireless keyboard. As described herein, the execution of the keyboard standby agent may include the initiation of a countdown clock that determines whether this threshold time period has passed. Concurrently, the wireless keyboard microcontroller executes a keyboard actuation/engagement agent such that the wireless keyboard microcontroller is notified if and when a user has actuated a key on the wireless keyboard or has detected, via an actuation/engagement sensor, the user at the wireless keyboard. Where the execution of the keyboard actuation/engagement agent by the wireless keyboard microcontroller indicates actuation of a keyboard key or presence of the user, this countdown clock is reset, and the keyboard standby agent waits for the countdown to be met.

At block 520, therefore, the wireless keyboard microcontroller determines whether the threshold time period has been reached by the countdown being met. Where it has not due to the execution of the keyboard actuation/engagement agent indicating user actuation of a keyboard key or presence of a user, the method 500 returns to block 520 described herein. However, where the user has walked away from the wireless keyboard thereby allowing the threshold time limit to expire at block 525, the method 500 continues to block 530.

At block 530, the wireless keyboard microcontroller causes the wireless keyboard to enter into a standby mode that reduces the power consumption of the wireless keyboard. However, the wireless keyboard radio and even the microcontroller may continue to operate to scan or monitor for wireless communications from the information handling system or to be ready to detect a keystroke or user presence. Thus, power is still consumed, but at a lower level. In prior art systems, this may drain the dry cell batteries.

At block 535, the wireless keyboard microcontroller may switch power sources from the wireless keyboard battery to the ultracapacitor. Because the ultracapacitor was previously charged via actuation of the keyboard keys and operation of the solenoidal energy harvester device, the ultracapacitor has sufficient power to power the wireless keyboard for a time while in standby mode. However, depending on the length of time that the wireless keyboard is in standby mode, the ultracapacitor may not be capable of powering the wireless keyboard and eventually, the wireless keyboard microcontroller may switch back to operating the wireless keyboard off of the power of the wireless keyboard battery when power has been drained in the ultracapacitor as described herein. Nonetheless, this will prolong the life of the wireless keyboard battery, especially dry cell batteries.

At block 540, the wireless keyboard microcontroller, via execution of the keyboard actuation/engagement agent, may monitor for user actuation of a keyboard key and/or user engagement with the wireless keyboard. As described herein, the execution of the keyboard actuation/engagement agent looks for, at least, one of two triggering events that will bring the wireless keyboard out of the standby mode. The first triggering event includes an actuation of any keyboard key as detected by a key actuation detector which may be a key switch that is mechanical, capacitive, electrical, resistive, magnetic, or other known in the art. In an embodiment, when input from any keyboard key is received at the wireless keyboard microcontroller, the wireless keyboard microcontroller wakes up and executes the actuation/engagement sensor as described herein. A second triggering event could include, in some embodiments, signals received from an actuation/engagement sensor. In an embodiment, the actuation/engagement sensor is an IR camera or sensor that detects the presence of the user in front of the wireless keyboard. In another embodiment, the actuation/engagement sensor is a motion sensor that detects bumps or movement of the wireless keyboard. It is appreciated that the wireless keyboard microcontroller, executing the keyboard actuation/engagement agent, may receive input from any of these sensors and/or from any keyboard key in order to trigger the wireless keyboard microcontroller to wake up.

At block 545, therefore, the wireless keyboard microcontroller determines whether keyboard key actuation or user presence has been detected. Where user presence or keyboard key actuation has not been detected, the method moves to block 550 with the wireless keyboard microcontroller being maintained in the standby mode and the ultracapacitor continuing to provide power to the wireless keyboard. However, as described herein, the ultracapacitor itself may run out of power prior to the user reengaging with the wireless keyboard. As such, at block 555, the wireless keyboard microcontroller determines, via the wireless keyboard PMU, whether the available power in the ultracapacitor has been drained or not. If the power in the ultracapacitor has not been drained, the method 500 proceeds to block 550 as described herein.

Where the power has been drained from the ultracapacitor as determined at block 555 or where the keyboard key actuation or user engagement at the wireless keyboard is detected at block 545, the method 500 proceeds to block 560. At block 560 the wireless keyboard microcontroller, with the wireless keyboard PMU, switches the power source from the ultracapacitor to the wireless keyboard battery. Again, as described herein, by including the ultracapacitor and the solenoidal energy harvester device within the wireless keyboard, power is conserved at the wireless keyboard battery thereby reducing the frequency at which the user has to replace the wireless keyboard battery. This not only reduces the costs associated with operating the wireless keyboard but also reduces the number of batteries that need to be disposed of or recycled thereby reducing the environmental impact due to the operation of the wireless keyboard.

At block 565, the method 500 includes determining whether the wireless keyboard is still initiated. Where the wireless keyboard is still initiated, the method 500 proceeds to block 510 to perform the methods described herein. Where the wireless keyboard is no longer initiated, the method 500 may end.

The blocks of the flow diagrams of FIG. 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A wireless keyboard operatively coupled to an information handling system comprising:
    a wireless keyboard microcontroller;
    a wireless keyboard power management unit (PMU) to provide power to the wireless keyboard microcontroller and the wireless keyboard PMU operatively coupled to a battery and an ultracapacitor;
    a solenoidal energy harvester device operatively coupled to the wireless keyboard PMU and placed under a first key formed on the wireless keyboard to charge the ultracapacitor when the first key is actuated via a charging circuit;
    the wireless keyboard microcontroller executing code instructions of a keyboard actuation/engagement agent to determine when the wireless keyboard enters a standby mode and with the wireless keyboard PMU switch a power source to the ultracapacitor from the wireless keyboard battery when in standby mode.

2. The information handling system of claim 1 further comprising:
    the wireless keyboard microcontroller executing code instructions of a keyboard standby agent to determine when a threshold time period has expired since a user has last actuated any key on the wireless keyboard based on keyboard engagement data received by a keyboard actuation/engagement agent from the wireless keyboard microcontroller to place the wireless keyboard in a standby mode.

3. The information handling system of claim 1 further comprising:
    the wireless keyboard microcontroller executing code instructions of the keyboard actuation/engagement agent to determine when any key on the wireless keyboard is actuated as keyboard engagement data based on input from any key switch as an actuation/engagement sensor.

4. The information handling system of claim 1 further comprising:
    a proximity sensor formed in a housing of the wireless keyboard operatively coupled to keyboard actuation/engagement agent to detect the presence of the user of the wireless keyboard to determine keyboard engagement data provided to the wireless keyboard microcontroller.

5. The information handling system of claim 1, wherein the solenoidal energy harvester device causes passing of a magnet through a coil of wire in the solenoidal energy harvester device formed under the first key to cause a charge to be provided at the ultracapacitor to charge the ultracapacitor when not being used to power the wireless keyboard.

6. The information handling system of claim 1 further comprising:
    the wireless keyboard microcontroller to, via the wireless keyboard PMU, detect when the ultracapacitor has been drained of power and switch to the battery as a power source during standby mode.

7. The information handling system of claim 1 further comprising:
    the solenoidal energy harvester device comprising a magnet operatively coupled to an underside of the first key and a wire coil operatively coupled to a chassis within a housing of the wireless keyboard to receive the magnet into the wire coil to generate charge.

8. A method of operating a wireless keyboard operatively coupled to an information handling system comprising:
    with a solenoidal energy harvester device operatively coupled to a wireless keyboard power management unit (PMU) and placed under a key formed on the wireless keyboard, actuating the key and charging an ultracapacitor operatively coupled to the wireless keyboard PMU when a user actuates the key;
    detecting with a wireless keyboard microcontroller when a threshold period of time has expired since a user has last actuated a key on the wireless keyboard based on keyboard engagement data received from an actuation/engagement sensor and placing the wireless keyboard in a standby mode;

switching, with the wireless keyboard PMU, to power the wireless keyboard with the ultracapacitor in standby mode, and detecting with the wireless keyboard microcontroller when a key on the wireless keyboard is actuated based on input from the actuation/engagement sensor, providing the keyboard engagement data to the wireless keyboard microcontroller to switch a power source with the wireless keyboard PMU from the ultracapacitor to a battery.

9. The method of claim 8, wherein the key is a space key on the wireless keyboard.

10. The method of claim 8, wherein the key is a space key on the wireless keyboard with a plurality of solenoidal energy harvester devices.

11. The method of claim 8 further comprising:
detecting the presence of the user of the keyboard with a proximity sensor formed in a housing of the wireless keyboard as the actuation/engagement sensor for providing the keyboard engagement data to the wireless keyboard microcontroller to switch the power source with the wireless keyboard PMU from the ultracapacitor to the battery.

12. The method of claim 8 further, wherein the solenoidal energy harvester device formed under the key causes passing of a magnet through a wire coil to generate a charge to be provided at the ultracapacitor to charge the ultracapacitor when during actuation of the key.

13. The method of claim 12 further comprising:
detecting, at the wireless keyboard PMU, when the ultracapacitor has been drained of power and switching to the battery as a power source during standby mode.

14. The method of claim 12 further comprising:
with a plurality of solenoidal energy harvester devices operatively coupled to a wireless keyboard power management unit (PMU) and placed under a plurality of keys formed on the wireless keyboard, actuating the plurality of keys and charging the ultracapacitor operatively coupled to the wireless keyboard PMU when the user actuates the plurality of keys.

15. A wireless keyboard comprising:
a wireless keyboard microcontroller;
a wireless keyboard radio to wirelessly communicate with a host information handling system;
a power management unit (PMU) to provide power to the wireless keyboard microcontroller and the wireless keyboard radio, the wireless keyboard PMU operatively coupled to a battery and an ultracapacitor;
a solenoidal energy harvester device operatively coupled to the ultracapacitor and placed under a first key formed on the wireless keyboard to charge the ultracapacitor when the first key is actuated by a user;
the wireless keyboard microcontroller to determine when a threshold time period has expired since a user has last actuated any key on keyboard based on the keyboard engagement data received from a key switch for any key on the keyboard and to place the wireless keyboard in a standby mode;
the wireless keyboard microcontroller to operate with the wireless keyboard PMU to switch power from a battery to the ultracapacitor when in standby mode; and
the wireless keyboard microcontroller to detect when any key on the wireless keyboard is actuated based on input from the key switch and provide keyboard engagement data to the wireless keyboard microcontroller; and
the wireless keyboard controller to switch a power source from the ultracapacitor to the battery when a user is indicated as present with the keyboard engagement data.

16. The wireless keyboard of claim 15 further comprising:
a proximity sensor formed in a housing of the wireless keyboard operatively coupled to keyboard actuation/engagement agent to detect the presence of the user of the keyboard as the keyboard engagement data provided to the wireless keyboard microcontroller to indicate that a user is present.

17. The wireless keyboard of claim 15, wherein the solenoidal energy harvester device operates by passing of a magnet coupled under the first key through a wire coil of the solenoidal energy harvester device in a chassis of the wireless keyboard to cause a charge to be provided to the ultracapacitor to charge the ultracapacitor when not being used to power the wireless keyboard.

18. The wireless keyboard of claim 15 further comprising:
the wireless keyboard microcontroller to, via the wireless keyboard PMU, detect when the ultracapacitor has been drained of power and switch to the battery as a power source during standby mode.

19. The wireless keyboard of claim 15 further comprising:
a plurality of solenoidal energy harvester devices comprising a plurality of magnets operatively coupled to an underside of a plurality of keys and a plurality of wire coils operatively coupled within a housing of the wireless keyboard under the plurality of keys to receive the plurality of magnets into the plurality of wire coils when each of the plurality of keys is actuated to charge the ultracapacitor.

20. The wireless keyboard of claim 15 further comprising:
wherein the first key is a space bar on the wireless keyboard.

\* \* \* \* \*